(12) United States Patent
Choi et al.

(10) Patent No.: US 8,194,635 B2
(45) Date of Patent: Jun. 5, 2012

(54) APPARATUS AND METHOD FOR UPLINK SCHEDULING CONSIDERING CHARACTERISTIC OF POWER AMPLIFIER IN MOBILE COMMUNICATION TERMINAL

(75) Inventors: Sunghyun Choi, Seoul (KR);
Kwang-Hun Han, Icheon-si (KR);
Young-Kyu Choi, Incheon (KR);
Yong-Hwan Lee, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1077 days.

(21) Appl. No.: 12/148,964

(22) Filed: Apr. 23, 2008

(65) Prior Publication Data
US 2008/0259899 A1 Oct. 23, 2008

(30) Foreign Application Priority Data
Apr. 23, 2007 (KR) .................. 10-2007-0039257

(51) Int. Cl.
*H04J 3/00* (2006.01)
(52) U.S. Cl. ...... 370/345; 370/311; 370/328; 370/395.4
(58) Field of Classification Search .............. 370/311, 370/345, 468, 519, 522, 328, 395
See application file for complete search history.

(56) References Cited

U.S. PATENT DOCUMENTS

| | | | |
|---|---|---|---|
| 2004/0181569 A1* | 9/2004 | Attar et al. ................. | 709/200 |
| 2007/0037600 A1* | 2/2007 | Fukuda ..................... | 455/522 |
| 2007/0123184 A1* | 5/2007 | Nesimoglu et al. ........ | 455/127.1 |
| 2008/0025341 A1* | 1/2008 | Rao et al. .................. | 370/468 |
| 2008/0095198 A1* | 4/2008 | Wager et al. .............. | 370/519 |

FOREIGN PATENT DOCUMENTS

| | | |
|---|---|---|
| KR | 10-2001-0024484 | 3/2001 |
| KR | 10-2007-0025379 | 3/2007 |

* cited by examiner

*Primary Examiner* — Hassan Kizou
*Assistant Examiner* — Toan Nguyen

(57) ABSTRACT

An UpLink (UL) scheduling method and apparatus considering a characteristic of a power amplifier in a mobile communication terminal are provided. The UL scheduling method includes calculating a packet transmission time, which minimizes energy consumed in packet transmission, by using a Direct Current (DC) voltage used in a power amplifier for signal amplification and by using nonlinear amplification efficiency; and scheduling UL data by using the calculated packet transmission time.

11 Claims, 6 Drawing Sheets

APPARATUS AND METHOD FOR UPLINK SCHEDULING CONSIDERING CHARACTERISTIC OF POWER AMPLIFIER IN MOBILE COMMUNICATION TERMINAL

CROSS-REFERENCE TO RELATED APPLICATION(S) AND CLAIM OF PRIORITY

The present application claims priority under 35 U.S.C. §119(a) to a Korean patent application filed in the Korean Intellectual Property Office on Apr. 23, 2007 and assigned Serial No. 2007-39257, the entire disclosure of which is hereby incorporated by reference.

TECHNICAL FIELD OF THE INVENTION

The present invention relates generally to an apparatus and method for performing UpLink (UL) scheduling by considering a characteristic of a power amplifier in a mobile communication terminal, and in particular, to an apparatus and method for performing UL scheduling by calculating a packet transmission time which maximizes energy efficiency according to the characteristic of the power amplifier.

BACKGROUND OF THE INVENTION

In general, when a mobile communication terminal transmits UpLink (UL) data, there is a known trade-off relationship between time and energy needed to transmit an information bit. That is, transmission energy efficiency increases in proportion to a transmission time. There are various data transmission scheduling methods based on such a trade-off relationship. Examples of the methods include lazy scheduling and move right scheduling.

The known trade-off relationship between the time and energy needed to transmit the information bit is obtained under several theoretical assumptions. That is, the trade-off relationship is obtained without proper consideration of a characteristic of a power amplifier (see FIG. 1) included in the mobile communication terminal.

To know energy consumed by the mobile communication terminal, the trade-off relationship between the time and energy needed to transmit the information bit has conventionally been attained by using an output of a node $P_{tx}$ 105 of the power amplifier under the assumption that energy obtained from a Direct Current (DC) voltage 103 is used to amplify a signal input through a node $P_{in}$ 101 at a fixed efficiency below 1 and the amplified signal is output to the node $P_{tx}$ 105.

However, since the power amplifier receives energy needed to amplify the signal from the DC voltage 103, energy used by the mobile communication terminal to transmit an actual signal is equivalent to energy provided to the power amplifier from the DC voltage 103. In addition, the power amplifier has a characteristic of a nonlinear efficiency, that is, amplification efficiency varies according to a range of a signal to be amplified, rather than a fixed efficiency.

Hence, there is a need for a method of performing UL scheduling by considering the trade-off relationship between the time and energy needed to transmit the information bit according to the characteristic of the power amplifier included in the mobile communication terminal.

SUMMARY OF THE INVENTION

To address the above-discussed deficiencies of the prior art, it is a primary aspect of the present invention is to solve at least the above-mentioned problems and/or disadvantages and to provide at least the advantages described below. Accordingly, an aspect of the present invention is to provide an apparatus and method for performing UpLink (UL) scheduling by considering a characteristic of a power amplifier in a mobile communication terminal.

Another aspect of the present invention is to provide an apparatus and method for performing UL scheduling by considering a trade-off relationship between time and energy needed to transmit an information bit in a mobile communication terminal.

Another aspect of the present invention is to provide an apparatus and method for performing UL scheduling by calculating a packet transmission time, which maximizes energy efficiency, in a mobile communication terminal.

In accordance with an aspect of the present invention, a UL scheduling method considering a characteristic of a power amplifier in a mobile communication terminal is provided. The method includes: calculating a packet transmission time, which minimizes energy consumed in packet transmission, by using a Direct Current (DC) voltage used in a power amplifier for signal amplification and by using nonlinear amplification efficiency; and scheduling UL data by using the calculated packet transmission time.

In accordance with another aspect of the present invention, a UL scheduling apparatus considering a characteristic of a power amplifier in a mobile communication terminal is provided. The apparatus includes: a transmission time calculator for calculating a packet transmission time, which minimizes energy consumed in packet transmission, by using a DC voltage used in a power amplifier for signal amplification and by using nonlinear amplification efficiency; and a scheduler for scheduling UL data by using the calculated packet transmission time.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, an apparatus and method of the present invention will be described in which a packet transmission time, which maximizes energy efficiency, is calculated by considering a trade-off relationship between time and energy needed to transmit an information bit according to a characteristic of a power amplifier included in a mobile communication terminal and in which UpLink (UL) scheduling is performed by using the packet transmission time.

Figure 1:
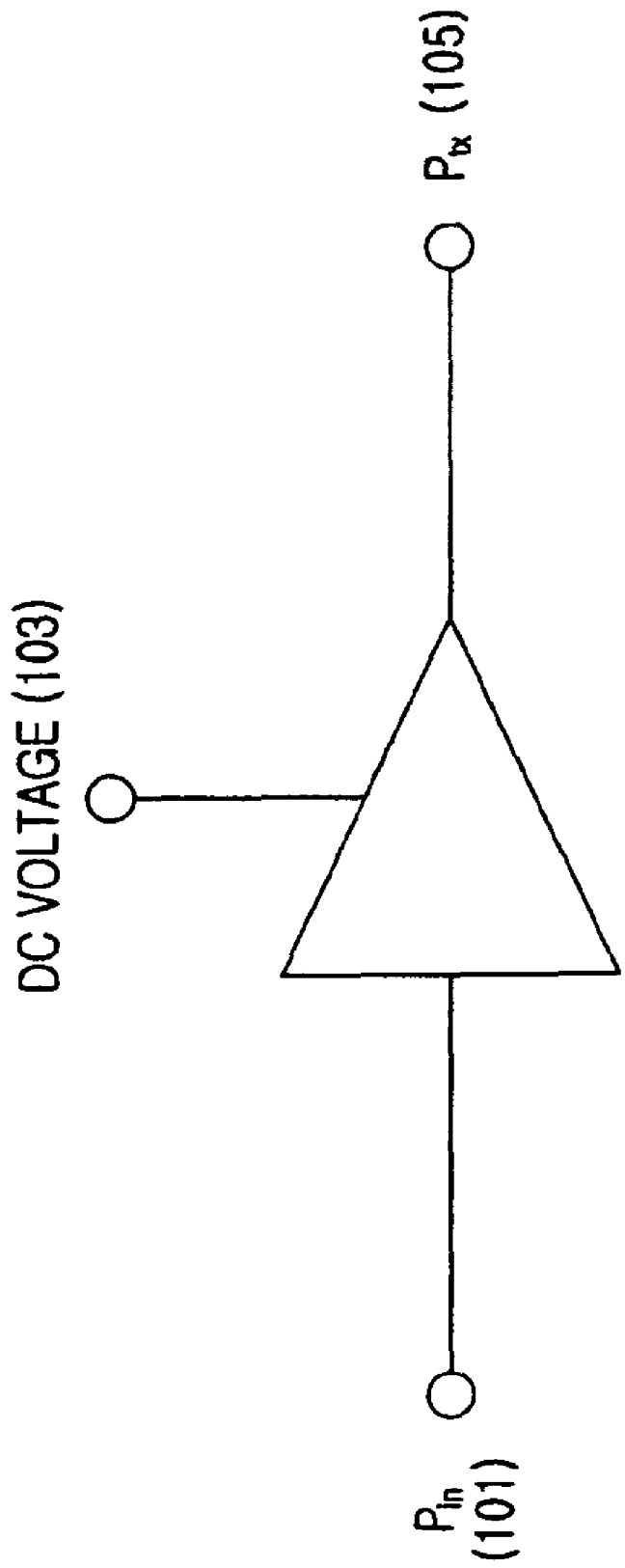
FIG. 1 illustrates a structure of a typical power amplifier.

Referring to FIG. 1, when a signal is input to a node $P_{in}$ 101, the power amplifier amplifies the input signal to obtain a signal having a magnitude suitable to be transmitted through a pass band according to energy provided from a Direct Current (DC) voltage 103, and then outputs the amplified signal to a node $P_{tx}$ 105. In the power amplifier, a level of power required for signal amplification is different according to a range of the amplified signal output to the node $P_{tx}$ 105, and can be expressed by Equation 1 below.

Equation 1 expresses nonlinear amplification efficiency of the power amplifier:

$$P_{pa} = \frac{P_{tx}}{\eta(P_{tx})}, 0 \leq P_{tx} \leq P_{tx,max}. \quad \text{[Eqn. 1]}$$

In Equation 1, $P_{pa}$ denotes power consumed to amplify a signal in the power amplifier, $P_{tx}$ denotes power of a signal transmitted through the pass band in the power amplifier, and $P_{tx,max}$ denotes a maximum limit of $P_{tx}$. In addition, $\eta(P_{tx})$ denotes amplification efficiency. As a exemplified nonlinear function having a parameter of $P_{tx}$, $\eta(P_{tx})$ can be expressed by Equation 2 below:

$$\eta(P_{tx}) = aP_{tx}^b \quad \text{[Eqn. 2]}$$

where $$a = \frac{\eta_{max}}{\sqrt{P_{tx,max}}},$$

$$b = \frac{1}{2}.$$

Equation 2 expresses energy amplification efficiency in consideration of the characteristic of the power amplifier.

In the following descriptions, an efficiency relationship between time and energy needed to transmit an information bit will be explained according to the nonlinear relationship between the consumed power $P_{pa}$ and the amplification efficiency $\eta(P_{tx})$ with respect to the maximum limit $P_{tx}$, as expressed by Equation 1 and Equation 2 above.

Energy consumed by the mobile communication terminal to transmit an actual signal is equivalent to energy provided to the power amplifier from the DC voltage 103, and can be expressed by Equation 3 below.

Equation 3 expresses energy consumed by the terminal to transmit a UL signal when we assume that the amplification efficiency is Equation 2:

$$E_r(t) = tP_{pa} = t\frac{P_{tx}}{\eta(P_{tx})}. \quad \text{[Eqn. 3]}$$

In Equation 3, $E_r(t)$ denotes energy consumed by the terminal for signal transmission, t denotes a time for transmitting one information bit, and $P_{tx}$ denotes signal power transmitted through the pass band. $P_{tx}$ can be expressed by Equation 4 below:

$$P_{tx} = \frac{N}{\alpha}(2^{\frac{2}{t}} - 1). \quad \text{[Eqn. 4]}$$

In Equation 4, denotes a noise power in a Gaussian channel, and $\alpha$ denotes power attenuation depending on a distance and channel condition.

Energy consumed by the terminal for UL signal transmission and expressed by Equation 3 can be redefined as Equation 5 below by using Equation 2 and Equation 4:

$$E_r(t) = \frac{1}{\eta_{max}}\sqrt{\frac{NP_{tx,max}(2^{\frac{2}{t}} - 1)}{\alpha}t}. \quad \text{[Eqn. 5]}$$

Figure 2:
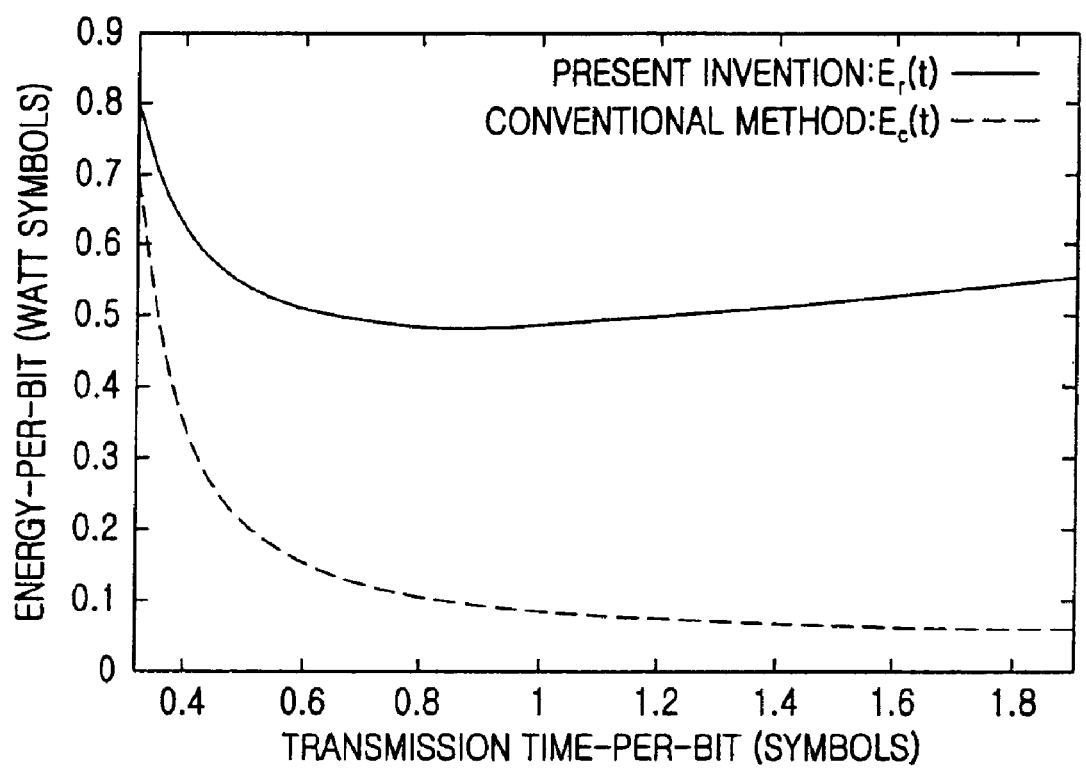
FIG. 2 is a graph illustrating energy efficiency with respect to a transmission time according to the present invention in comparison with the conventional method.

Energy efficiency redefined as expressed by Equation 5 above can be represented by a graph of FIG. 2.

FIG. 2 is a graph illustrating energy efficiency with respect to a transmission time according to the present invention in comparison with the conventional method. In the graph, the horizontal axis represents a transmission time required to transmit one information bit, and the vertical axis represents energy consumed to transmit one information bit.

In FIG. 2, a graph $E_c(t)$ shows a trade-off relationship between time and energy needed to transmit an information bit without considering a characteristic of a power amplifier according to the conventional method, and a graph $E_r(t)$ shows a trade-off relationship between time and energy needed to transmit an information bit by considering the characteristic of the power amplifier according to the present invention.

Referring to FIG. 2, in the graph $E_c(t)$, the consumed energy decreases as the transmission time required to transmit one information bit increases. In the graph $E_r(t)$, the consumed energy decreases until the transmission time required to transmit one information bit reaches a specific time, and increases when the transmission time is greater than or equal to the specific time. That is, when the characteristic of the power amplifier is considered, an optimal transmission time exists at which the energy consumed by the terminal to transmit data is minimized. The optimal transmission time satisfies a range of a Signal to Noise Ratio (SNR) of −3~30 dB in which the terminal transmits data in a cellular system.

Now, a technique for calculating an optimal transmission time, which minimizes energy consumption of the terminal, and for performing UL scheduling by using the optimal transmission time will be described.

Figure 3:
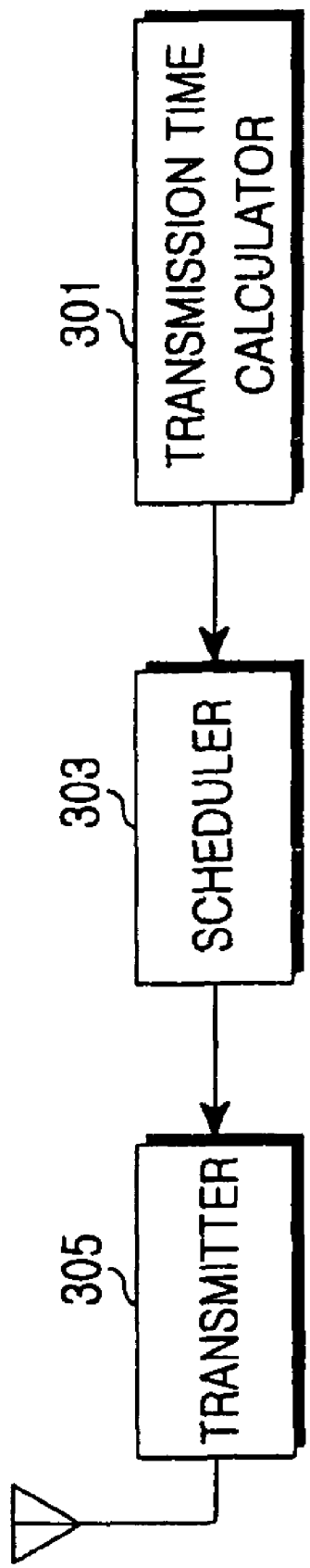
FIG. 3 is a block diagram of a mobile communication terminal according to the present invention.

FIG. 3 is a block diagram of a mobile communication terminal according to the present invention. The terminal includes a transmission time calculator 301, a scheduler 303, and a transmitter 305.

Referring to FIG. 3, when the terminal transmits UL data to a Base Station (BS), the transmission time calculator 301 calculates a transmission time which maximizes transmission energy efficiency, that is, an optimal transmission time which minimizes energy to be consumed. Thereafter, the transmission time calculator 301 provides the optimal transmission time to the scheduler 303. A method of calculating the optimal transmission time will be described below with reference to FIG. 4.

The scheduler 303 receives the optimal transmission time from the transmission time calculator 301, and provides data to the transmitter 305 by scheduling the data to be transmitted to the BS. A scheduling method using the optimal transmission time will be described below with reference to FIG. 5.

The transmitter 305 transmits data to the BS according to the scheduled data provided from the scheduler 303.

Figure 4:
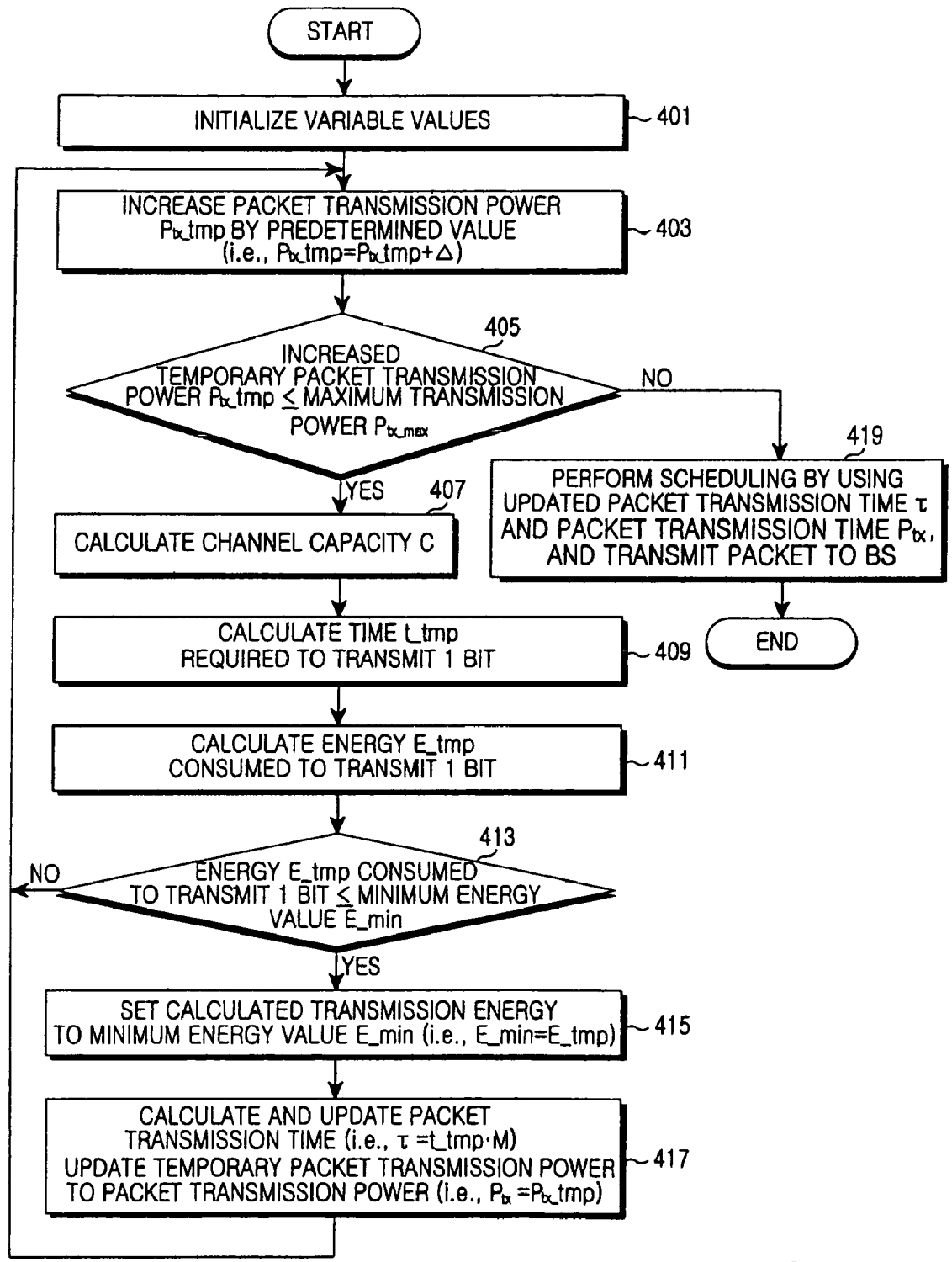
FIG. 4 is a flowchart illustrating a process of calculating a packet transmission time, which maximizes energy efficiency, in a mobile communication terminal according to the present invention.

FIG. 4 is a flowchart illustrating a process of calculating a packet transmission time, which maximizes energy efficiency, in a mobile communication terminal according to the present invention.

Referring to FIG. 4, variable values are initialized to be used in calculation of the optimal transmission time which maximizes the energy efficiency in step 401. In step 403, a packet transmission power $P_{tx\_}$tmp used to transmit a packet is increased by a predetermined value $\Delta$ (i.e., $P_{tx\_}$tmp=$P_{tx\_}$tmp+$\Delta$). In step 405, the increased packet transmission power $P_{tx\_}$tmp is compared with a maximum transmission power $P_{tx\_max}$ which is a limit value of the power amplifier.

If the increased packet transmission power is less than or equal to the maximum transmission power (i.e., $P_{tx\_}$tmp$\leq P_{tx\_max}$), proceeding to step 407, a channel capacity C of the increased packet transmission power is calculated. Then, in step 409, a time for transmitting one information bit is calculated by using the channel capacity C (i.e., t_tmp=1/C). The channel capacity can be calculated by using a Shannon's capacity formula C=½ $\log_2(1+\zeta(P_{tx\_}$tmp))). Herein, $\zeta$ is $\alpha$/N where N denotes a noise power in a Gaussian channel and $\alpha$ denotes power attenuation depending on a distance.

In step 411, an energy E_tmp needed to transmit one information bit is calculated by using Equation 1 above, that is, E_tmp=t_tmp·$P_{tx\_}$tmp/$\eta(P_{tx\_}$tmp). In step 413, the obtained energy E_tmp is compared with a minimum energy value E_min. The minimum energy value is set to an infinite value in the initialization process of step 401.

If the calculated energy is greater than the minimum energy value (i.e., E_tmp>E_min), the procedure returns to step 403 to examine a packet transmission power and time which minimize energy consumption. Then, the packet transmission power is again increased by the predetermined value, and the subsequent steps are repeated.

Otherwise, if the calculated energy is less than or equal to the minimum energy value (i.e., E_tmp$\leq$E_min), it is determined that the increased packet transmission power and the calculated transmission time for one information bit can minimize the energy consumption, and, proceeding to step 415, the calculated energy E_tmp is set to the minimum energy value E_min (i.e., E_min=E_tmp). In step 417, by using the time t_tmp needed to transmit one information bit and a size M of a packet to be transmitted, a time $\tau$ needed to transmit the packet is calculated to be updated (i.e., $\tau$=t_tmp·M), and the increased packet transmission power $P_{tx\_}$tmp is updated to a packet transmission power $P_{tx}$, that is, $P_{tx}=P_{tx\_}$tmp.

Then, the procedure returns to step 403 to examine if there is a packet transmission power and time which can further minimize energy consumption than the updated packet transmission power and time. Thus, the increased packet transmission power $P_{tx\_}$tmp is again increased by the predetermined value (i.e., $P_{tx\_}$tmp=$P_{tx\_}$tmp+$\Delta$), and the subsequent steps are repeated.

If the increased packet transmission power is greater than the maximum transmission power (i.e., $P_{tx\_}$tmp>$P_{tx\_max}$) in step 405, proceeding to step 419, scheduling is performed according to the updated packet transmission time $\tau$ and the packet transmission time $P_{tx}$, and the packet is transmitted to a base station (BS).

Thereafter, the procedure of FIG. 4 ends.

Figure 5:
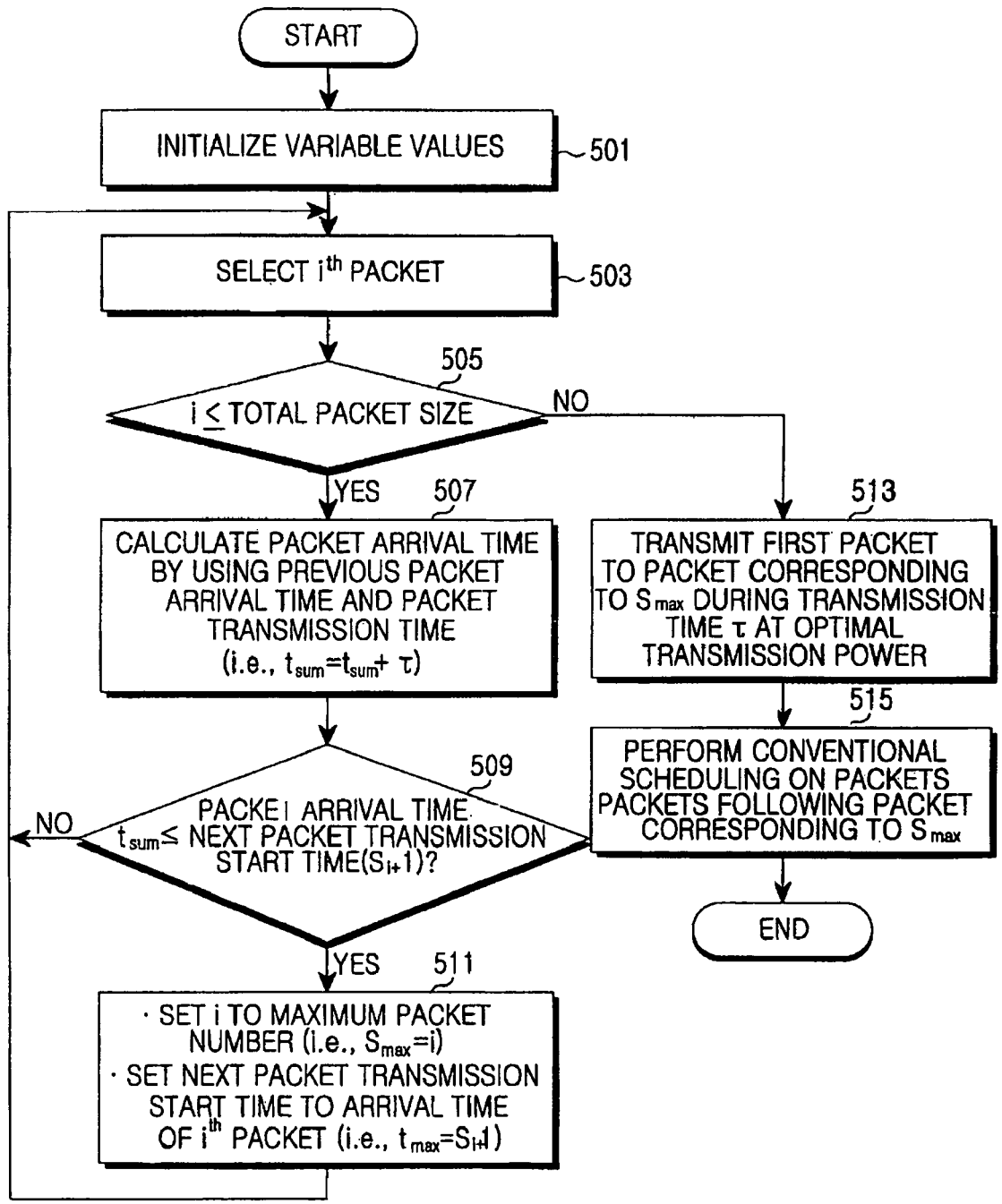
FIG. 5 is a flowchart illustrating a process of performing scheduling by using a packet transmission time calculated in a mobile communication terminal according to the present invention.

FIG. 5 is a flowchart illustrating a process of performing scheduling by using a packet transmission time calculated in a mobile communication terminal according to the present invention. The laze scheduling method is assumed to be used in the scheduling methods as an example.

Referring to FIG. 5, variable values for UL data scheduling are initialized by using a packet transmission power and a packet transmission time $\tau$ which minimize energy consumption in step 501. In step 503, an $i^{th}$ packet is selected. In step 505, it is determined whether the selected $i^{th}$ packet is less than or equal to a total packet size M (i.e., i$\leq$M). When the $i^{th}$ packet is selected, packet selection is sequentially performed starting from a first packet.

If the $i^{th}$ packet is less than or equal to the total packet size, proceeding to step 507, an arrival time of the $i^{th}$ packet is calculated under the assumption that the $i^{th}$ packet is transmitted during the packet transmission time $\tau$ which minimizes the energy consumption. The arrival time of the $i^{th}$ packet can be calculated by summing a previous packet arrival time $t_{sum}$ and the packet transmission time $\tau$ (i.e., $t_{sum}+\tau$). If the $i^{th}$ packet is the first packet, a packet transmission start time S1 of the first packet is used as the previous packet arrival time. The transmission start time of the first packet is set in the initialization process.

In step 509, the calculated arrival time of the $i^{th}$ packet is compared with a next packet transmission start time $S_i$+1. If the arrival time of the $i^{th}$ packet is greater than the next packet transmission start time (i.e., $t_{sum}$>$S_i$+1), returning to step 501, the subsequent steps are repeated. Otherwise, if the arrival time of the $i^{th}$ packet is less than or equal to the next packet transmission start time (i.e., $t_{sum}\leq S_i$+1), proceeding to step 511, i is set to a maximum packet number (i.e., $S_{max}$=i), and the next packet transmission start time is set to the arrival time of the $i^{th}$ packet (i.e., $t_{sum}=S_i$+1). Then, returning to step 503, the subsequent steps are repeated.

Otherwise, if the $i^{th}$ packet is greater than the total packet size (i.e., i>M) in step 505, proceeding to step 513, packets are transmitted with the optimal transmission power which minimizes the energy consumption, starting from the first packet to $S_{max}^{th}$ packet. In step 515, the transmission powers of remaining $(S_{max}+1)^{th}$ to $M^{th}$ packets are determined by using the conventional lazy scheduling method, and the packets are transmitted to a BS.

Thereafter, the procedure of FIG. 5 ends.

Figure 6:
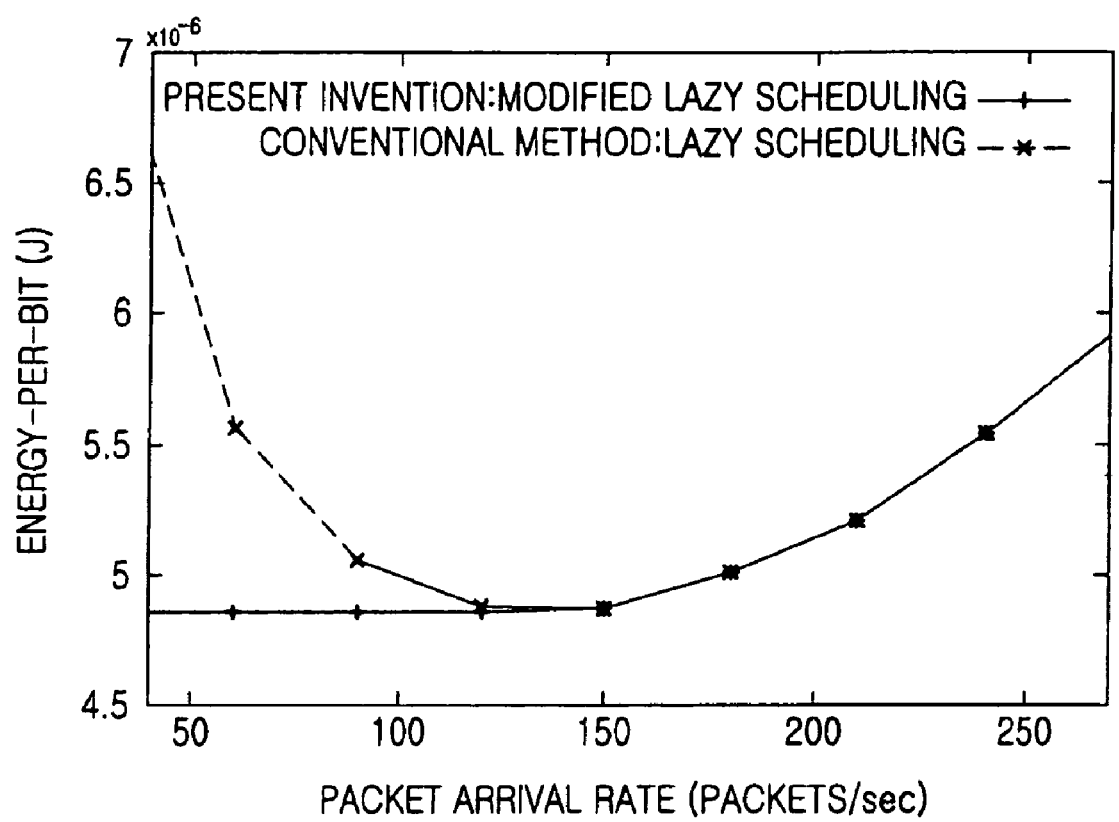
FIG. 6 is a graph illustrating a result obtained by performing scheduling using a packet transmission time according to the present invention in comparison with the conventional method.

FIG. 6 is a graph illustrating a result obtained by performing scheduling using a packet transmission time according to the present invention in comparison with the conventional method. In the following descriptions, the horizontal axis represents a packet arrival rate, and the vertical axis represents an amount of consumed energy.

In FIG. 6, a graph showing a trade-off relationship between a packet arrival rate and an amount of consumed energy when a packet is transmitted according to the conventional lazy scheduling method is compared with a graph showing a trade-off relationship between a packet arrival rate and a consumed energy amount when a packet is transmitted by using a packet transmission time, which minimizes energy consumption, in consideration of a characteristic of a power amplifier according to the present invention.

Referring to FIG. 6, when the packet is transmitted by using the conventional lazy scheduling method without considering the characteristic of the power amplifier, the amount of consumed energy is great when a packet arrival rate is below a specific point. On the other hand, when the packet transmission time, which minimizes energy consumption, is calculated by considering the characteristic of the power amplifier and the packet is transmitted by performing scheduling by the use of the packet transmission time according to the present invention, the amount of consumed energy is small. That is, the lazy scheduling, in which a packet is transmitted unnecessarily for a long time at a predetermined packet arrival rate or below, consumes more energy.

Although the lazy scheduling method has been described as an example of a method of calculating an optimal packet transmission time, which minimizes energy consumption, that is, minimizes energy efficiency, and of performing scheduling by using the calculated time, the present invention may also apply to other conventional scheduling methods.

According to the present invention, a packet transmission time which maximizes energy efficiency is calculated by considering a trade-off relationship between time and energy needed to transmit an information bit depending on a characteristic of a power amplifier, and UL scheduling is performed by using the packet transmission time in a mobile communication terminal. Therefore, there is an advantage in that an amount of energy consumed in the mobile communication terminal can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An UpLink (UL) scheduling method considering a characteristic of a power amplifier in a mobile communication terminal, the method comprising:
    calculating a packet transmission time, which minimizes energy consumed in packet transmission, using a Direct Current (DC) voltage used in a power amplifier for signal amplification and nonlinear amplification efficiency; and
    scheduling UL data by using the calculated packet transmission time.

2. The method of claim 1, wherein the calculating a packet transmission time comprises:
    increasing a packet transmission power by a predetermined level and calculating a channel capacity and a transmission time for one information bit with respect to the increased packet transmission power;
    calculating transmission energy for one information bit by using the packet transmission power and the transmission time for one information bit corresponding to the packet transmission power;
    examining a minimum energy value of the calculated transmission energy; and
    calculating a packet transmission time by using the transmission time for one information bit corresponding to the examined minimum energy value and a size of packet to be transmitted.

3. The method of claim 2, wherein the channel capacity is calculated by using Equation:

$$C = \frac{1}{2}\log_2\left(1 + \frac{\alpha P_{tx}}{N}\right),$$

where C denotes a channel capacity, N denotes a noise power in a Gaussian channel, a denotes power attenuation depending on a distance, and $P_{tx}$ denotes a packet transmission power.

4. The method of claim 2, wherein the transmission energy for one information bit is calculated by using the equation:

$$E_r(t) = t\frac{P_{tx}}{\eta(P_{tx})},$$

where $E_r(t)$ denotes energy consumed by the mobile communication terminal to transmit one information bit, t denotes a time for transmitting one information bit, $P_{tx}$ denotes a packet transmission power, and η denotes amplification efficiency.

5. The method of claim 1, wherein the scheduling UL data by using the calculated packet transmission time comprises:
    calculating a number of transmission packets corresponding to the calculated packet transmission time;
    transmitting the calculated number of transmission packets during the calculated packet transmission time; and
    scheduling remaining packets during a time which follows the calculated packet transmission time in a given packet transmission time by using a conventional lazy scheduling algorithm.

6. An UpLink (UL) scheduling apparatus considering a characteristic of a power amplifier in a mobile communication terminal, the apparatus comprising:
    a transmission time calculator configured to calculate a packet transmission time, which minimizes energy consumed in packet transmission, using a Direct Current (DC) voltage used in a power amplifier for signal amplification and nonlinear amplification efficiency; and
    a scheduler configured to schedule UL data by using the calculated packet transmission time.

7. The apparatus of claim 6, wherein the transmission time calculator is configured to increase a packet transmission power by a predetermined level, calculate a channel capacity and a transmission time for one information bit with respect to the increased packet transmission power, and thereafter calculate transmission energy for one information bit by using the packet transmission power and the transmission time for one information bit corresponding to the packet transmission power.

8. The apparatus of claim 7, wherein, after calculating the channel capacity and the transmission time for one information bit with respect to the packet transmission time, the transmission time calculator is configured to calculate the transmission energy for one information bit by using the calculated channel capacity and the transmission time.

9. The apparatus of claim 8, wherein the channel capacity is calculated by using the equation:

$$C = \frac{1}{2}\log_2\left(1 + \frac{\alpha P_{tx}}{N}\right),$$

where C denotes a channel capacity, N denotes a noise power in a Gaussian channel, a denotes power attenuation depending on a distance, and $P_{tx}$ denotes a packet transmission power.

10. The apparatus of claim 7, wherein the transmission energy for one information bit is calculated by using the equation:

$$E_r(t) = t\frac{P_{tx}}{\eta(P_{tx})},$$

where $E_r(t)$ denotes energy consumed by the mobile communication terminal to transmit one information bit, t denotes a time for transmitting one information bit, $P_{tx}$ denotes a packet transmission power, and η denotes amplification efficiency.

11. The apparatus of claim 6, wherein the scheduler is configured to calculate a number of transmission packet corresponding to the calculated packet transmission time and transmit the calculated number of transmission packets during the calculated packet transmission time in a given packet transmission time and schedule remaining packets during a time which follows the packet transmission time by using a conventional lazy scheduling algorithm.

* * * * *